United States Patent

[11] 3,598,134

[72] Inventor Louis A. Ollivier
 Menlo Park, Calif.
[21] Appl. No. 19,941
[22] Filed Mar. 16, 1970
 Division of Ser. No. 713,669, Mar. 18, 1968,
 Pat. No. 3,534,753.
[45] Patented Aug. 10, 1971
[73] Assignee Veriflo Corporation
 Richmond, Calif.

[54] RATIO CONTROLLER FOR GASES
 10 Claims, 10 Drawing Figs.
[52] U.S. Cl. .................................................. 137/7,
 137/88
[51] Int. Cl. .......................................... G05d 11/03
[50] Field of Search .............................. 137/3, 7, 88

[56] References Cited
 UNITED STATES PATENTS
 1,936,538 11/1933 Borden .......................... 137/88 X
 2,072,384 3/1937 Schmidt ........................ 137/88 X
 2,169,175 8/1939 Ziebolz et al. ................. 137/88 X Primary Examiner—Robert G. Nilson
Attorney—Owen, Wickersham & Erickson ABSTRACT: A mixture of two gases is supplied at any desired ratio, and a ratio once set is maintained over wide variations in pressure and during either continuous or intermittent flow. Two flow controllers are used, one for each gas, and each one comprises three stacked diaphragms to give flow as demanded by superimposing a command signal on a flow based on the differential pressure of each supply gas and the ratio-metering orifice. A chamber on one side of one diaphragm supplies bias based on the supply pressure while the command signal is sent to a second chamber on the other side of the same diaphragm. Two other diaphragms define between them a chamber open to the atmosphere and close off respectively the second chamber and an output chamber. The command signal originates in a pressure controller where the output pressure of the final mixture is measured against a reference pressure to obtain a command signal pressure from the original regulated supply of one of the two gases (both of which are supplied at substantially identical regulated pressure). This command signal is fed to the flow controllers through the ratio setter, and the other flow controller chambers are supplied from supply pressure through a constant orifice.

INVENTOR
LOUIS A. OLLIVIER

*Owen, Wickersham & Erickson*
ATTORNEYS

INVENTOR.
LOUIS A. OLLIVIER

Owen, Wickersham & Erickson
ATTORNEYS

INVENTOR.
LOUIS A. OLLIVIER

INVENTOR
LOUIS A. OLLIVIER

Owen, Wickersham & Erickson
ATTORNEYS

RATIO CONTROLLER FOR GASES

This application is a division of application, Ser. No. 713,669, filed Mar. 18, 1968, now U.S. Pat. No. 3,534,753, dated Oct. 20, 1970.

This invention relates to controlling the output ratio of a mixture of two gases which are individually supplied at substantially the same regulated pressure. The output ratio is fully variable from all of one gas through all ratios of mixtures to all of the other gas, and any ratio, when set, is maintained over a wide range of pressures somewhat below the supply pressure, even though the demand be intermittent and variable.

One important use of the invention is to control the ratio of oxygen to air in respirators and other breathing equipment. Here it solves the problem of providing both continuous flow at a desired ratio, as for premature infants, and intermittent flow at a constant desired ratio, as in respirators. For example, from individual supplies of compressed air and oxygen at a regulated pressure between 50 and 60 p.s.i., it delivers any mixture of the two gases, i.e., any ratio of the two from air only to oxygen only. It also regulates the pressure of the mixture at the outlet, typically from about 10 to 40 p.s.i.

The invention employs two flow controllers, one for each of the two gases, in combination with one pressure controller and one ratio setter. The two flow controllers are identical and operate on the principle of maintaining a differential pressure across an orifice, the flow being determined by the magnitude of the differential pressure and by the area of the orifice. This differential pressure is established between the input pressure of each gas and its output pressure. The regulated supply pressure is used as a source for the generation of a pressure signal by the pressure controller according to the demand for the mixture through the ratio setter. The signal goes to the flow controllers through the ratio setter, the areas of the orifices in the flow controllers being fixed. The pressure controller senses the mixture's output pressure, compares it to a desired set pressure, and generates the command signal as the function of this difference. The output pressure is directly related to the flow demand: for instance, a decrease in output pressure indicates a greater flow demand; so a resulting command signal is sent to the flow controllers to give an increased flow. Conversely, an increase in output pressure means a decrease in flow demand, and a command signal is sent to the flow controllers to reduce the flow. When the flow demand is zero, the command signal causes the flow controllers to shut off all flow.

The ratio setter has two pneumatic dividing circuits which operate on the pressure signal generated by the pressure controller to create two signals which are sent to their respective flow controllers to govern the output ratio there. The adjustment of the ratio setter increases one output signal while simultaneously decreasing the other. At midscale the two output signals are both equal to the input signal from the pressure controller. As the ratio is adjusted away from its mid position, one output signal remains equal to the input signal, while the other output signal decreases until it reaches its minimum value, which is below atmospheric pressure. The differential pressures created by the flow controllers across their fixed orifices are proportional to the signals sent by the ratio setter. Therefore, the relative values of the output signals determine the ratio of the two flows of air and oxygen in any proportion.

Other objects and advantages of the invention will appear from the following description of some preferred forms thereof:

Figure 1:
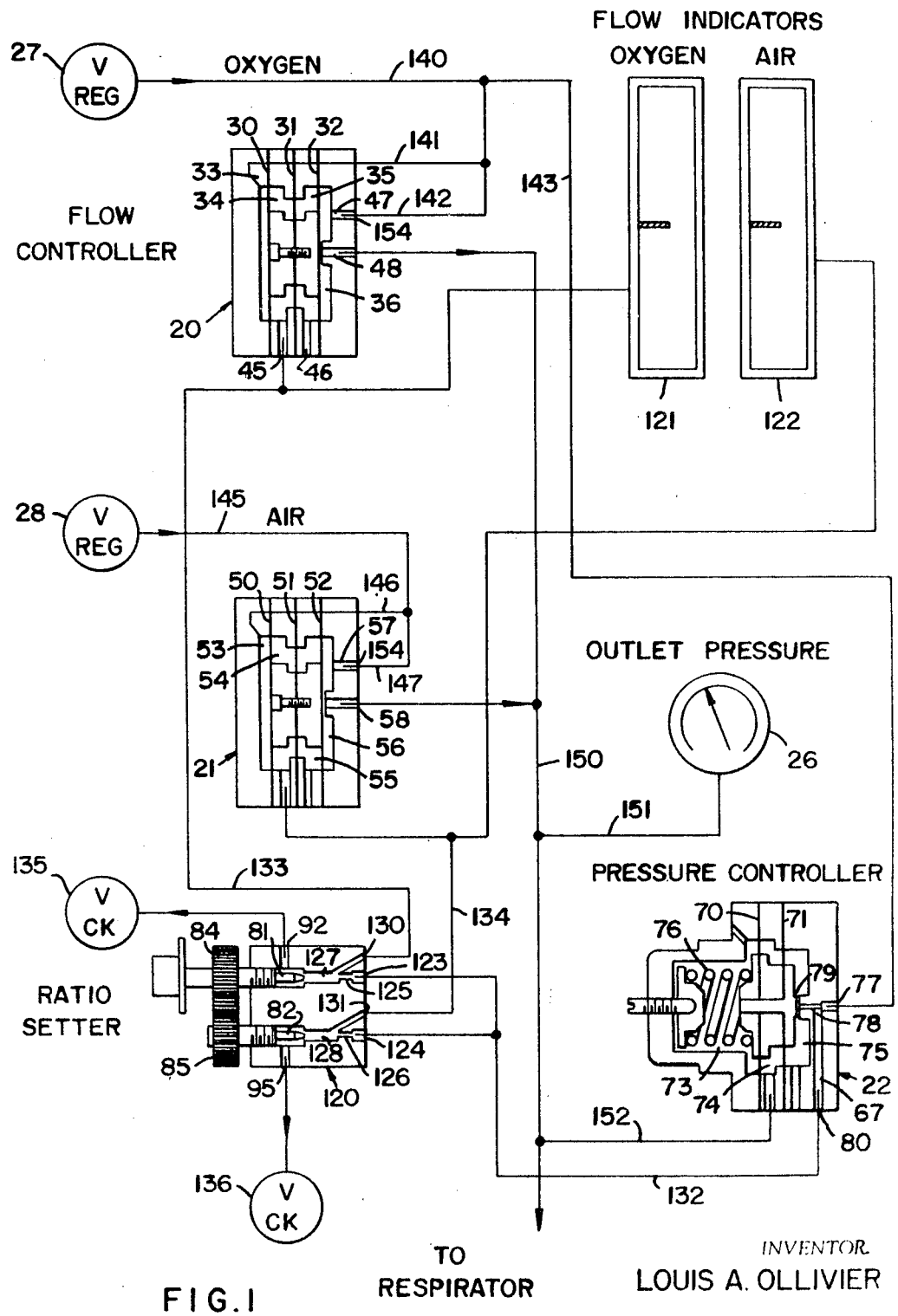
FIG. 1 is a diagrammatical view of a system embodying the principles of the invention for mixing two regulated gases at about the same pressure and to supply the mixed output at a desired pressure and at demand flow.

In the form of the invention shown in FIG. 1, the invention employs two substantially identical flow controllers 20 and 21 in conjunction with a pressure controller 22 and a ratio setter 120. Two flow indicators 121 and 122 are used, the indication of the flow of each gas being an important advantage of this system, and an outlet pressure gauge 26 is also employed. A first gas, such as oxygen, from a regulated source of supply 27 flows simultaneously to the flow controller 20 and the pressure controller 22. Similarly, a second gas, such as compressed air, from a regulated source of supply 28 flows to the flow controller 21. Of course, any two gases may be used so long as their initial regulated pressures are substantially identical, but oxygen and air will be used as examples.

The ratio setter 120 comprises two pneumatic dividing circuits which operate on the pressure signal generated by the pressure controller 22 to create two signals which are sent to the respective flow controllers 20 and 21, and an output mixture of oxygen and air regulated at a pressure indicated by the guage 26 is supplied from these two flow controllers 20 and 21 in the correct ratio.

The two flow controllers 20 and 21 are preferably identical or substantially so, both of them being a stack of three diaphragms providing four chambers.

In the flow controller 20, the three diaphragms 30, 31, and 32 provide successive chambers 33, 34, 35, and 36, while in the flow controller 21, the three diaphragms 50, 51, and 52 provide successive chambers 53, 54, 55, and 56. Housing members 37, 38, 39, and 40 (see FIGS. 2—5) hold the diaphragms 30, 31, and 32 in place with the aid of machine screws 41, and cooperate with the diaphragms to define the chambers 33, 34, 35, and 36. Similar housing members and bolts do the same for the flow controller 21.

Oxygen goes from the regulated supply source 27 by conduit 140 and branch conduits 141, 142, and 143 (1) to the outermost chamber 33, where it is retained as a reference pressure bearing against the diaphragm 30, (2) to the inlet 47 of the chamber 36, and (3) to the inlet 77 to the pressure controller 22. Compressed air goes from the regulated supply 28 directly by conduit 145 and branches 146 and 147 (1) to the chamber 53 and bears against the diaphragm 50, and (2) to the inlet 57 to the chamber 56. There is also a leaf spring 43 in each chamber 33 and 53, bearing against the diaphragms 30 and 50 and supplying a bias pressure that is adjusted by a screw 44 that bears on the spring 43. The adjustment enables the factory to balance the diaphragm assembly so that it starts to open the outlet 48 from the chamber 36 when the command signal starts to increase from a zero value.

The command signal goes from the pressure controller 22 by the conduit 132 to the ratio setter 120, which transmits ratioed command signals to the chambers 34 and 54 of the flow controllers 20 and 21, via an inlet 45 into the chamber 34 between the diaphragms 30 and 31, while the chamber 35 is open to the atmosphere via an opening 46. The same is true in the flow controller 21. The chamber 36 has an inlet 47 and an outlet 48. Similarly, the chamber 56 has an inlet 57 and an outlet 58. There is also a fixed-bias leaf spring 59 in each of the chambers 36 and 56 acting on the diaphragms 32 and 52.

Figure 2:
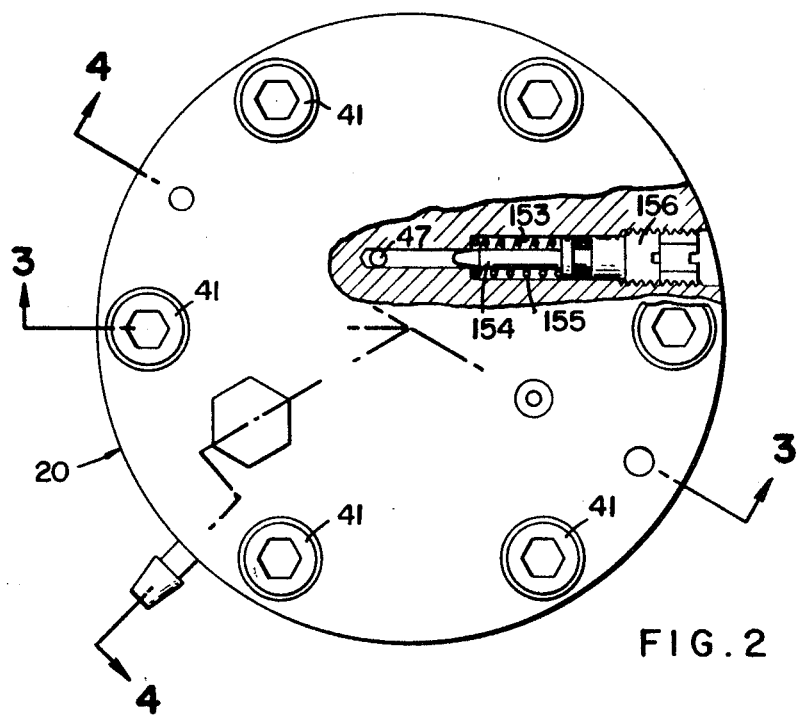
FIG. 2 is a top plan view of one of the two identical flow controllers of FIG. 1, a portion being broken away and shown in section.
Figure 3:
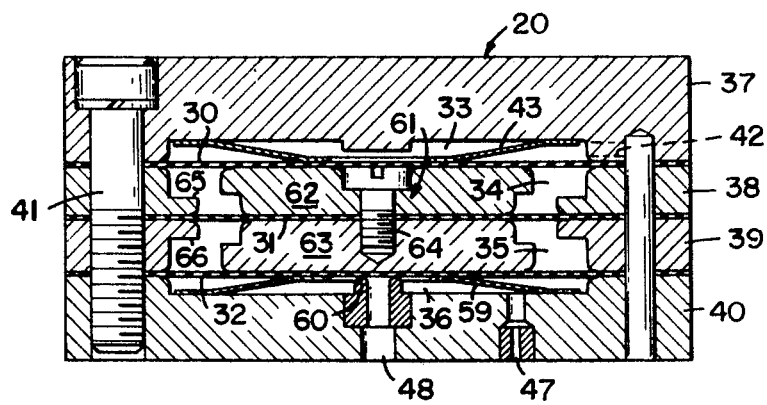
FIG. 3 is a view in section taken along the line 3–3 in FIG. 2.
Figure 5:
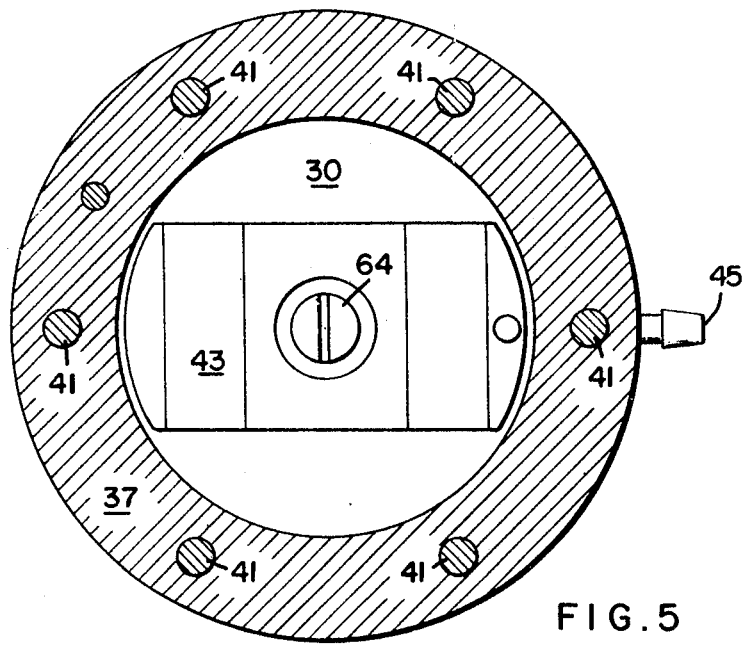
FIG. 5 is a view in section taken along the line 5–5 in FIG. 4.
Figure 4:
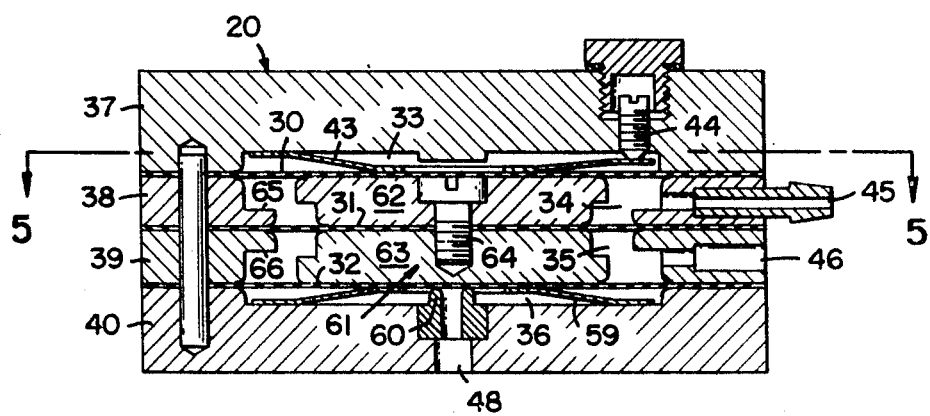
FIG. 4 is a view in section taken along the line 4–4 in FIG. 2.

In the outlet 48 is a flow-defining seat 60 against which the diaphragm 32 bears to cut off the output flow or from which it is separated to enable flow in an amount depending upon the position of the diaphragm 32. The flow controller 21 has the same arrangement. From the outlets 48 and 58 oxygen and air flow into the output conduit 150, with branches 151 and 152 to the gauge 26 and pressure controller 22. The inlet orifice 47 to the chamber 36 (and the orifice 57 to the chamber 56) are fixed in area. In order to be an exact value, they may be made factory adjustable, as shown in FIG. 2 by a stepped passage 153, a needle valve 154, a spring 155, and an adjustment screw 156 used only at the factory.

In both flow controllers 20 and 21 the three diaphragms are united into an assembly 61 by plates 62 and 63 and a machine screw 64. The upper and lower diaphragms 30 and 32 (or 50 and 52) have equal effective areas. The command signals, obtained from the pressure controller 22 via the ratio controller 120 in a manner to be described later, are applied to the chamber 34 (or 54) between the diaphragms 30 and 31 (or 50 and 51), and the diaphragms 31 and 51 have a smaller effective area than the diaphragms 30 and 32 or 50 and 52, due to ribs 65 and 66 on housing members 38 and 39. Since the chamber 35 is open to the atmosphere, the command signal creates a force directed to moving the diaphragm assembly 61 away from the seat 60. An equilibrium exists in operation when the two forces are equal, and then a differential pressure is maintained which is proportional to the command signal. The proportionality factor is the ratio of the difference between the effective areas of the upper and central diaphragms 30 and 31 to the effective area of the upper and lower diaphragms 30 and 32.

Figure 6:
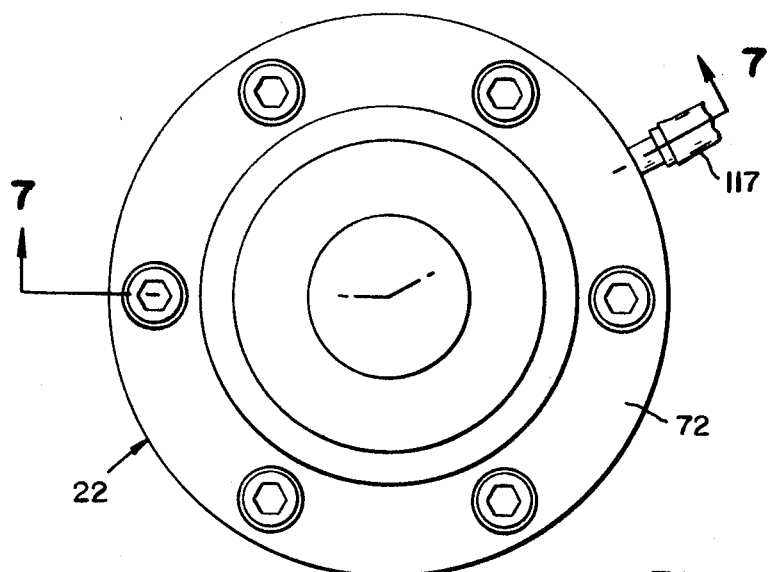
FIG. 6 is a top plan view of the pressure controller of the system of FIG. 1.
Figure 7:
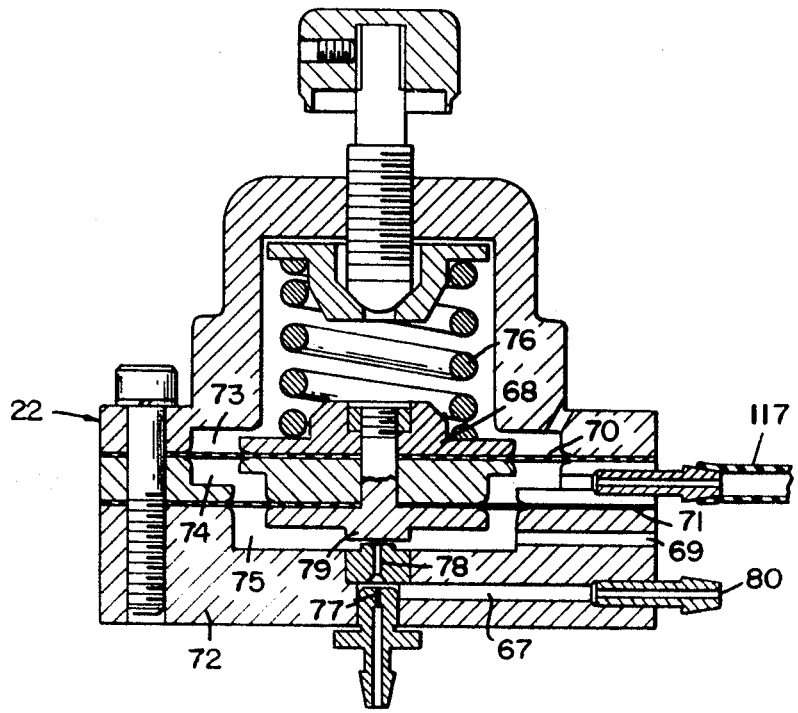
FIG. 7 is a view in section taken along the line 7–7 in FIG. 6.

As shown in FIGS. 1, 6, and 7, the pressure controller 22 is used to sense the pressure by a combination of two diaphragms 70 and 71, the upper diaphragm 70 having a larger effective area, a housing 72 cooperating with the diaphragms 70 and 71 to provide chambers 73, 74, and 75. The chamber 73 is open to the atmosphere, while pressure applied by the conduit 152 to the chamber 74 between the two diaphragms 70 and 71 creates a force proportional to the outlet pressure. That force is opposed by a force which is created by adjusting the compression of a coil spring 76. An equilibrium exists when these forces are equal, that is, when the input pressure is equal to the pressure corresponding to the compression of the spring 76. Any deviation from that equilibrium position is sensed by a pneumatic detector and the amount of deviation is expressed by a variation of the value of the command signal. The pneumatic detector comprises an input orifice 77 supplied by the regulated oxygen pressure from the source 27. The flow through the orifice 77 passes via a nozzle 78 into the chamber 75, whence it is exhausted to atmosphere by an outlet 69. The opening of the nozzle 78 into the chamber 75 is throttled by the movement of a plate 79 which forms part of a diaphragm assembly 68. Under these conditions, the pressure of the passage 67 between the orifice 77 and the nozzle 78 is related to the spacing of the plate 79 from the nozzle 78. When the nozzle 78 is closed, the pressure in the passage 67 is equal to the pressure supplied to the orifice 77. When the nozzle 78 is open, and there is typically a 0.005- to 0.010-inch clearance between the nozzle face and the plate 79 of the diaphragm assembly 68, the intermediate pressure in the passage 67 goes to zero or even goes below zero due to the venturi effect of the orifice flow into the nozzle inlet.

Any deviation from the set point causes the diaphragm assembly 68 to move, and the slightest displacement, such as 0.001 inch, is converted into a large corresponding change of 5 to 10 p.s.i. in the pressure transmitted through an outlet 80 from the passage 67, which pressure serves to generate, through the ratio setter 120 command signals for the flow controllers 20 and 21 in the system of FIG. 1.

Figure 8:
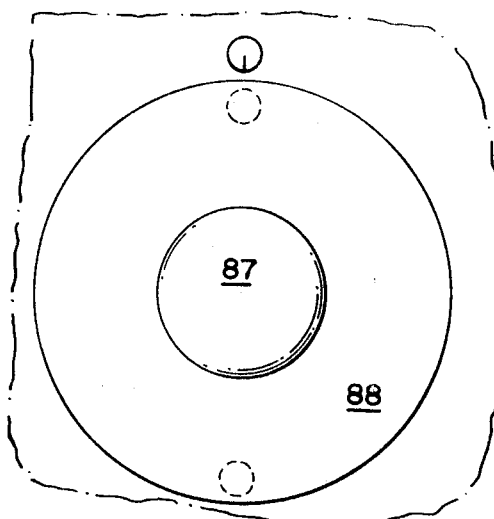
FIG. 8 is a view in elevation of the ratio setter used in the system of FIG. 1.
Figure 9:
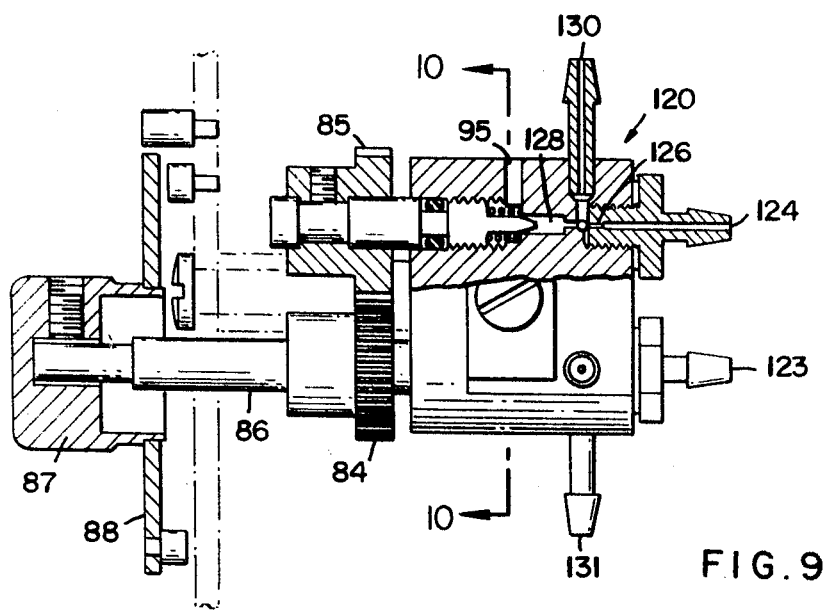
FIG. 9 is a view partly in section and partly in elevation of the ratio setter in FIG. 8.
Figure 10:
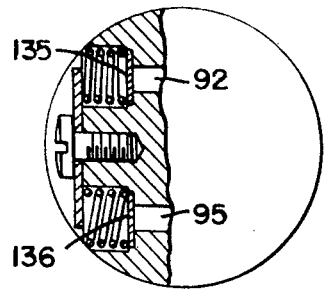
FIG. 10 is a view in section taken along the line 10–10 in FIG. 9.

The ratio setter 120 (see also FIGS. 8—10) comprises two precision metering valves 81 and 82, both spring loaded by a spring 83 to provide repeatability and driven in opposite directions by a set of gears 84 and 85. The stem 86 of the valve 82 is extended to receive a knob 87 for a manual setting and a dial 88 to indicate the setting. Positive stops are incorporated on the knob and dial assembly to establish the limits of the ratio indication and to prevent undue stress from being applied to the gear assembly. Each gear 84, 85 is preferably fastened to the stem of its valve 81, 82 by a setscrew to provide a convenient means for shifting one valve 81, 82 against the other for alignment during calibration. When the knob 87 is turned, both valves 81 and 82 are operated to change the area of an orifice between an inlet 123 and an outlet 92 and also to change the area of an orifice between an inlet 124 and an outlet 95. The orifices are changed in opposite direction — one being made larger, while the other is made smaller.

The outlets 92 and 95 pass gas off to the atmosphere through lightly loaded check valves 135 and 136. The inlets 123 and 124 have reduced cross section nozzles 125 and 126 into a passage 127 or 128 whence pressure goes to outlets 130 and 131; so there is a variable exhaust area for the flow supplied by the input signal, which comes from the pressure controller 22 via a conduit 132 and through the fixed orifices 125 and 126. The pressure created in the passages 127 and 128 between each orifice 125, 126 and its valve 81, 82 is related to the opening of the valve 81, 82. This pressure in the passage 127, 128 is equal to the input signal to the inlet 123, 124 when the valves 81, 82 are closed, and it is zero when the valves 81, 82 are sufficiently open. Thus, the output signals from the outlet 130, 131 are proportional to the input signal, and the ratio is determined by the relative opening of the valves 81, 82.

The output signals from the ratio controller 120 are sent by conduits 133 and 134 from the outlets 130 and 131 to the respective flow controllers 20 and 21 and to the flow indicators 121 and 122. At the flow controllers 20 and 21, these pressures serve as the command signals.

Continuing to use oxygen and air as examples of two gases, the oxygen coming from the regulated source 27 flows through a conduit 140 from which branch conduits 141, 142 and 143 directly lead, respectively: (1) to the chamber 33 to establish a reference pressure against the diaphragm 30 in the flow controller 20, (2) to the fixed-area inlet orifice 47 of the chamber 36, and (3) to the inlet orifice 77 of the pressure controller 22. From the pressure controller 22, a master command signal flows via the conduit 132 to the ratio setter 120. At the ratio setter 120, the oxygen flow is proportioned to the airflow by the needle valves 81 and 82. The proportioned command signal for oxygen goes from the outlet 130 of the ratio setter 120 via a conduit 133 to the inlet 45 of the chamber 34 in the flow controller 20, to set up the differential pressure there, and to the oxygen flow indicator 121.

The compressed air flows via a conduit 145 from the source 28 to two branch conduits 146 and 147, which, respectively, flow directly: (1) in the chamber 53 bounded by the diaphragm 50 in the flow controller 21, (2) to the inlet 57 in the chamber 56 in the flow controller 21. The air command signal from the ratio setter 120 passes by the outlet 131 and conduit 134 into the chamber 54 in the controller 21, to set up the differential pressure there and to the airflow indicator 122.

The oxygen from the flow controller outlet 48 and the compressed air from its flow controller outlet 58 flow into a common conduit 150, which has branches 151 and 152 leading respectively to the outlet pressure gauge 26 and to the chamber 74 in the pressure controller 22. The demand upon the output line 150 affects its pressure and thereby moves the plate 79 toward or away from the nozzle 78; hence a master command signal from the outlet 80 of the pressure controller 22 is sent by the conduit 132 to the ratio controller 120 and thence, being divided, (1) to the chamber 34 between the diaphragms 31 and 32 and (2) to the chamber 54 between the diaphragms 51 and 52. There the command signal acts to move the diaphragm assembly 61 to vary the opening at the seat 60 and thereby to vary the flows through the orifices 48 and 58, which, however, always remain at the ratio set by the ratio setter 120.

The ratio controller may be operated by supplying air and oxygen, each at the same pressure (say between 50 and 60 p.s.i.g. and within 5 p.s.i.g. of each other). The outlet pressure may be set to a value from 10 p.s.i., in this instance, up to about 10 p.s.i. below the supply pressure or 40 to 50 p.s.i.g. Thus, there is a difference of about 10 p.s.i. as a minimum amount between the supply and outlet pressures for good operation of the flow controllers. The graduations on the dial 88 may indicate ratio values of oxygen to air at a number of intermediate steps, such as 10:1, 5:1, 3:1, 1:1, 1:2, 1:5, 1:10, between 0 air and 100 percent oxygen to 100 percent air and 0 oxygen.

In a no-flow condition, the pressure controller 22 creates a vacuum, and that vacuum is preserved by the two check valves 135 and 136 and transmitted to the flow controllers 20 and 21 where it shuts off the outlet passages 48 and 58.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for taking two gases at substantially identical supply pressures and for delivering a mixture of said gases at any desired ratio and for maintaining such ratio once set over a wide range of outlet pressure settings of the mixture and during either continuous or intermittent delivery of the mixture, including in combination:
   a common output conduit for said mixture,
   means for supplying each gas individually at substantially the same regulated pressure,
   means for providing a flow of each gas at a pressure lower than said supply pressure, each said means for providing comprising a fixed orifice provided directly with gas at said supply pressure and means for generating a differential pressure across said fixed orifice,
   means for setting the ratio at which the two gases flow into said common output conduit by simultaneously adjusting said differential pressures relative to each other, and
   means for further adjusting both said differential pressures according to the instantaneous demand for said mixture, as indicated by the variations in the pressure of said mixture in said common output conduit.

2. The device of claim 1 wherein said means for further adjusting both said differential pressures comprise means for generating a pressure signal related to the demand as expressed in the pressure in said common output conduit and said means for setting the ratio comprises a linked pair of valves having means for varying the areas of two main orifices so that one is enlarged while the other is diminished, each said valve having an inlet with a restricted orifice into which said pressure signal is sent and a delivery conduit downstream of said restricted orifice and upstream of said main orifice, said delivery conduit transmitting an output pressure controlling one said differential pressure.

3. A device for taking two gases at substantially identical regulated supply pressures and for delivering a mixture of said gases at a desired ratio, including in combination:
   two flow controllers, one for each gas, each having a housing and first, second, and third diaphragms cooperating to provide first, second, third, and fourth chambers, each having an inlet and said fourth chamber only having an outlet, said first chamber being connected to its gas at the supply pressure to bear against said first diaphragm, said third chamber being between said second and third diaphragms and open to the atmosphere, while said fourth chamber is on the opposite side of said third diaphragm from said third chamber, said third diaphragm being movable away from and toward said outlet to control the flow therefrom, said diaphragms being joined as an assembly for common movement according to the relative pressures in said chambers, the inlet to said fourth chamber having a fixed orifice and connected to the respective gas at its supply pressure, there being a pressure differential across said fixed orifice,
   a pressure controller having a housing and fourth and fifth diaphragms with different effective areas joined in an assembly, and providing fifth, sixth, and seventh chambers, said fifth chamber being open to the atmosphere and having spring bias means thereon bearing against said fourth diaphragm, the pressure applied to the sixth chamber between said fourth and fifth diaphragms creating a force proportional to that pressure and opposed by the force of said spring, means for applying the pressure of the output mixture to said sixth chamber, nozzle means leading into said seventh chamber and an outlet from said seventh chamber to atmosphere, a restricted orifice means connected to the supply pressure of one of said gases and to said nozzle, a passage leading to an outlet from a point in between said orifice means and the exit from said nozzle into said seventh chamber, said diaphragm assembly moving toward and away from said nozzle to admit gas or to block it from said seventh chamber and thereby change the pressure in said passage, and
   ratio setter means comprising two precision spring-loaded metering valves, each with an orifice between an inlet and an outlet, said outlet passing to the atmosphere, means for simultaneously driving said valves in opposite directions, so that as one is opened wider the other is being closed, the stem of one valve being extended and provided with a knob for manual setting of said ratio by setting the area of said two valve orifices, and each valve having an inlet connected to said passage in said pressure controller and having an inlet orifice and a second outlet on the same side of said orifice as said inlet and connected to said orifice and to said inlet on the opposite side of said inlet orifice from said passage, said second outlet being connected to the inlet to the second chamber of the corresponding flow controller.

4. The device of claim 3 wherein said first chamber includes spring bias means acting on said diaphragm assembly.

5. The device of claim 4 having means for regulating the pressure of at least one said spring bias means.

6. The device of claim 3 wherein the effective area of said second diaphragm is smaller than the effective area of said first diaphragm and wherein the effective areas of said first and third diaphragms are equal.

7. The device of claim 3 having flow-indicating means for the output flow of each said gas.

8. A method for mixing two gases at any desired ratio and for maintaining any such ratio once set over a wide range of outlet pressure settings and during either continuous or intermittent delivery of the mixture, in a delivery stream comprising:
   supplying each gas at substantially the same regulated pressure to a main stream and to a reference pressure station,
   withdrawing from one said main stream a branch stream and reducing the pressure of said branch stream,
   while varying the amount of pressure to which it is reduced according to the variations in the instantaneous pressure of said delivery stream,
   then dividing said branch stream into two control streams,
   adjusting the pressure of each said control stream relative to the other, by sending each through a fixed restriction and then bleeding it an adjustable amount, to provide a desired pressure ratio between the unbled portions of the two control streams,
   applying said unbled portions to said reference pressure stations to oppose each reference pressure with a respective control stream,
   restricting the flows of both said main streams through fixed restrictions to reduce their pressures, and opposing them at their reduced pressures to their respective reference pressures,
   so that each said reference pressure is opposed both by its associated main stream at said reduced pressure and by its respective unbled control stream portion, and
   then flowing said main streams at their reduced pressures into said delivery stream, each at a rate depending, first, on said ratio between the unbled portions of said control streams and, second, on the differential pressure between its said reference pressure and said reduced pressure and thereby on the instantaneous demand for the mixture.

9. Apparatus for mixing two gases at any desired ratio and for maintaining any such ratio, once set, during either continuous, fluctuating, or intermittent delivery of the mixture, there being a regulated supply of each gas, at substantially identical regulated pressures, including in combination:

two flow control means having valve means, one for each gas, for giving output flow according to the differential pressure between the supply pressure of its said gas and the pressure of its output flow, and according to a command signal, a common conduit for the output flow from both said flow control means, pressure control means having an orifice for utilizing variations in the output pressure in said common conduit, as affected by demand, to vary the flow of gas taken from one said regulated supply across said orifice, thereby to obtain a gas pressure that varies according to the instantaneous pressure in said common conduit, and ratio setter means for dividing the flow beyond said orifice into two streams at flows in a set ratio to each other, each stream comprising a said command signal, thereby regulating the proportions of the gases to each other sent through the valve means of said flow-control means to said common conduit.

10. A device which receives two gases at substantially identical regulated supply pressures and delivers a mixture of said gases at a desired ratio, including in combination:

a common output conduit for said mixture;

two flow controllers, one for each gas, each having means for establishing a reference pressure based on the supply pressure of that gas, said flow controller having a fixed orifice connected directly to said supply pressure gas, and providing each flow controller with a stream of that said gas at a pressure lower than said supply pressure, thereby setting up a differential pressure with respect to said reference pressure, means connected to said common output conduit for generating from one said gas at its supply pressure a signal pressure as a function of the instantaneous demand for said mixture, as indicated by the instantaneous pressure of said mixture in said common conduit, a linked pair of valves having mans for varying the areas of two main orifices so that one is enlarged while the other is diminished, each said valve having an inlet with a restricted orifice through which said signal pressure is sent and a delivery conduit downstream of said restricted orifice and upstream of said main orifice for conducting the pressure downstream of each said restricted orifice to one said flow controller as a signal pressure for that gas and hence ratioing said signal pressures, said signal pressures governing the flow of each gas from said flow controller into said common output conduit in accordance with the effect of said signal pressure on said reference pressure, said valves thereby setting the relative flow rates at which the two gases flow into said common output conduit.